United States Patent
Balzer et al.

[11] 3,759,000
[45] Sept. 18, 1973

[54] STAIR NOSING STRUCTURE

[75] Inventors: Claude P. Balzer; Almer A. Reiff; Edward M. Corman, all of Wichita, Kans.

[73] Assignee: Balco, Inc., Wichita, Kans.

[22] Filed: July 29, 1971

[21] Appl. No.: 167,257

[52] U.S. Cl. .................................. 52/179, 52/588
[51] Int. Cl. .............................. E04f 11/16
[58] Field of Search .................... 52/177, 179, 182, 52/188, 573, 588

[56] References Cited
UNITED STATES PATENTS
3,421,274   1/1969   Balzer et al. .......................... 52/179
3,331,171   7/1967   Hallock ............................ 52/573 X
3,381,775   5/1968   Livers .............................. 52/182 X FOREIGN PATENTS OR APPLICATIONS
761,150   6/1967   Canada ................................ 52/179

Primary Examiner—Frank L. Abbott
Assistant Examiner—John R. Masterman
Attorney—Claude A. Fishburn et al.

[57] ABSTRACT

A stair nosing structure for a stair step having a tread surface and a riser or forward facing surface includes an elongated base member and a removable cover strip member interlocked therewith in a co-acting rigid non-slip tread stair nosing forming a portion of the step tread surface. The base member is anchored to the step and the cover strip positioned with a forward edge portion thereof in registry with the riser or forward facing surface of the stair step.

12 Claims, 8 Drawing Figures

PATENTED SEP 18 1973 3,759,000
SHEET 1 OF 2
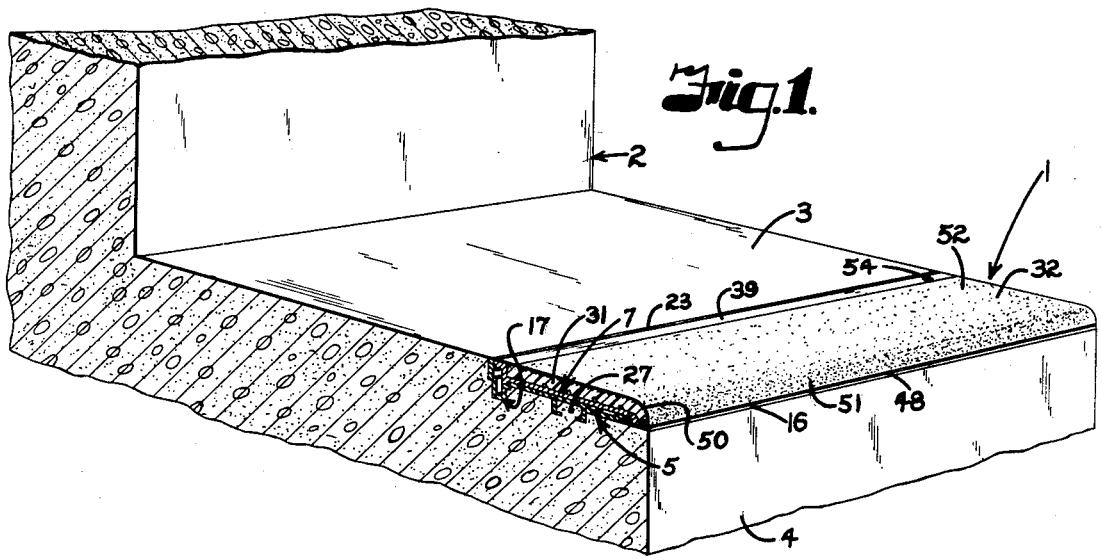
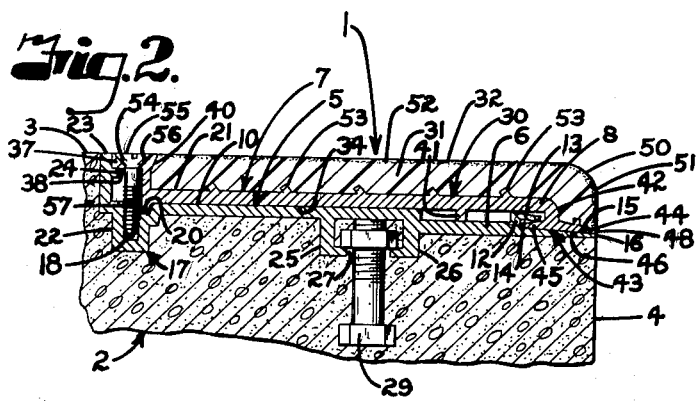
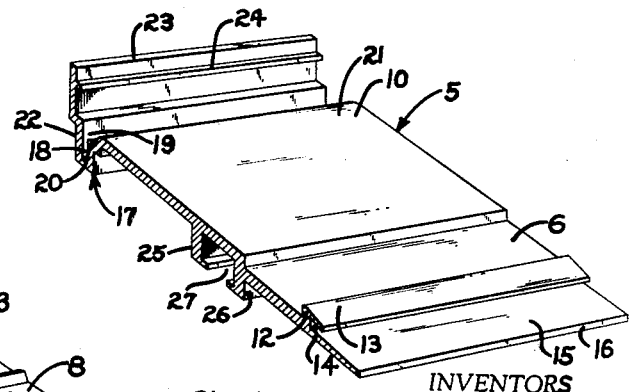
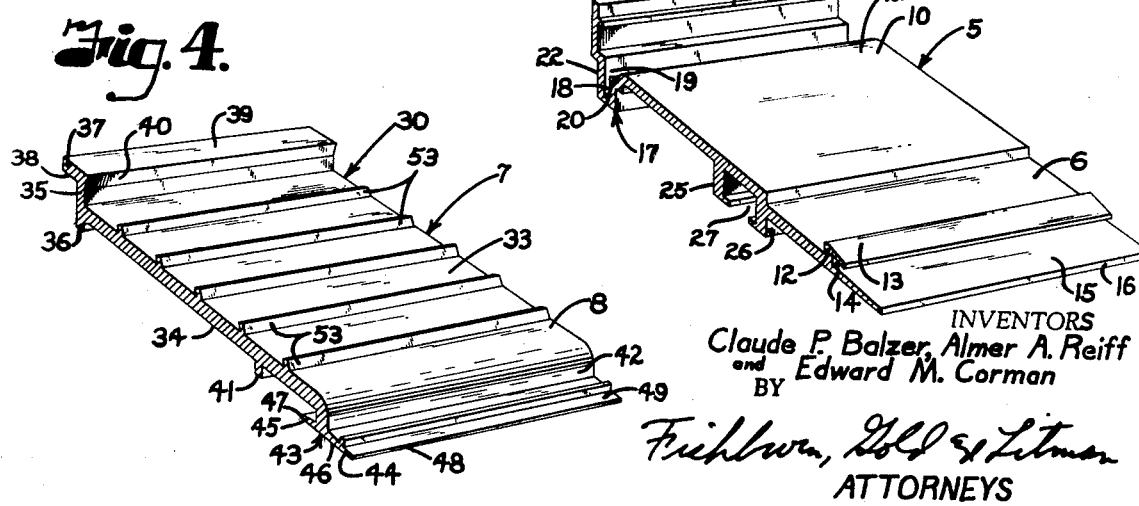
INVENTORS
Claude P. Balzer, Almer A. Reiff
and Edward M. Corman
BY
Frichlein, Gold & Litman
ATTORNEYS

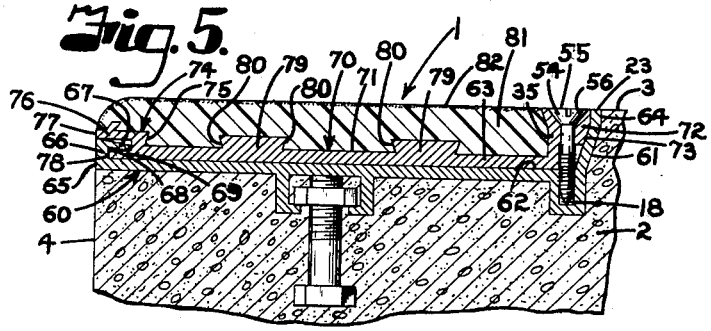
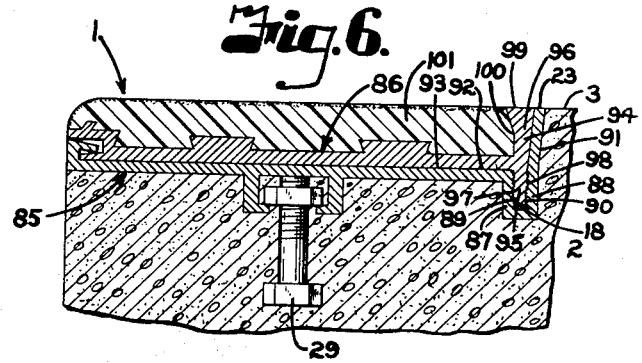
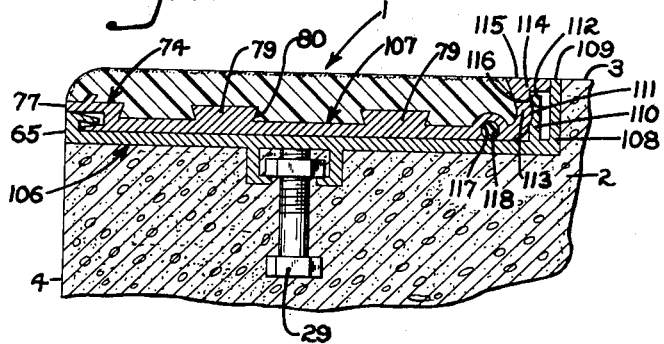
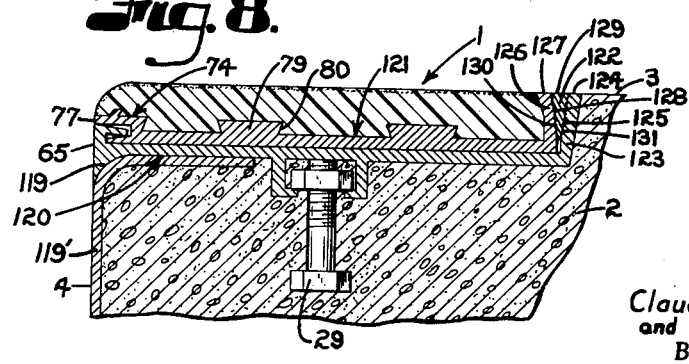

3,759,000

STAIR NOSING STRUCTURE

The present invention relates to stair nosing structures for stair steps having a tread surface and a riser or forward facing surface and more particularly to a stair nosing structure having a base member and a tread member overlying and removably secured to same with the tread member forming a portion of the tread surface of the step.

The principal objects of the present invention are: to provide a stair nosing structure having a base member to be installed in a stair tread during early stages of construction with the base member requiring a minimum of construction effort, a minimum of protection during subsequent construction operations and providing maximum protection for the stair tread; to provide such a stair nosing structure having a base member and a tread member with metal portions adapted to be formed by extrusions; to provide such a stair nosing structure with the tread member overlying the base member and with the base and tread members removably secured together and having a minimum of exposed metal in the finished step; to provide such a stair nosing structure in which the base member and cover or tread member have cooperating inclined surfaces and stop members that hold the tread member fixed in place and nose portions flush; to provide a stair nosing structure having forward edge portions of the base member and tread member maintained flush or in registry with each other and with a forward facing surface or riser of a stair step; to provide such a stair nosing structure adapted for use in on-site constructed treads and in preformed or pan type treads; to provide such a stair nosing structure having a tread member adapted to snap on a base member without fastening members securing same together; to provide such a stair nosing structure wherein the component parts thereof are maintained together in a substantially tight fit; to provide such a stair nosing structure requiring none or only a minimum of shop fabrication; and to provide such a stair nosing structure which is economical to manufacture, is easily installed, forms an attractive and long lasting structure, and which is particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include exemplary embodiments illustrating various objects and features of the stair nosing structure of the present invention.

FIG. 1 is a partial perspective view of a stair nosing structure embodying features of the present invention and shown in place on a stair step with portions broken away to show the structure.

FIG. 2 is an enlarged transverse sectional view through the stair step and stair nosing structure.

FIG. 3 is a partial perspective view of a base member of the stair nosing structure.

FIG. 4 is a partial perspective view of a tread member of the stair nosing structure.

FIG. 5 is an enlarged transverse sectional view through a stair step and a modified stair nosing structure having modified forward and rear edge portions of a base member and a tread member.

FIG. 6 is an enlarged transverse sectional view through a stair step and a modified stair nosing structure having cooperating portions to effect a drive fit between a tread member and a base member thereof.

FIG. 7 is an enlarged transverse sectional view through a stair step and a modified stair nosing structure having a snap on tread member.

FIG. 8 is an enlarged transverse sectional view through a stair step and a modified stair nosing structure having a wedge member to be driven between rear flange members of a base member and a tread member.

Referring more in detail to the drawings:

As required detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting but merely as a basis for the claims and as a represenative basis for teaching one skilled in the art to variously employ the present invention in virtually any appropriate detailed structure.

In the disclosed embodiment of the present invention, the reference numeral 1 generally designates a stair nosing structure for a stair step 2 having a tread surface 3 and a riser or forward facing surface 4. The stair nosing structure 1 includes an elongated base member 5 adapted to be mounted on the stair step 2 and having a forward portion 6 and an elongated tread member 7 overlying the base member 5 and having a forward portion 8 engaging the forward portion 6 of the base member 5. The base member 5 and the tread member 7 are formed to have interengaging and cooperating portions to secure the base member 5 and the tread member 7 together and to position respective forward portions 6 and 8 respectively relative to each other. It is preferred that at least part of the engaging and cooperating portions have inclined surfaces providing a wedging action to tighten or otherwise hold the tread member 7 on the underlying part of the base member 5 with a minimum of screws or other fastening devices. The structure also has cooperating surfaces that are engaged to position forward edges in registry. The base member 5 and the tread member 7 are particularly adapted to be formed of extrusions of metal, such as aluminum, brass, or other suitable metals.

In the structure illustrated in FIGS. 1 to 4 inclusive, the base member 5 is an elongated relatively rigid member adapted to be mounted on the stair step 2, as by being positioned in forms for constructing the stair step 2 and positioned adjacent the riser or forward facing surface 4 thereof. The base member 5 is generally flat or planar member and in the structure illustrated has the forward or front portion 6 offset or below a rear portion 10 thereof for a purpose as later described.

The base member 5 has an upstanding leg 12 terminating in a forward extending flange 13 forming a generally L-shaped member positioned to define a recess 14 between the flange 13 and said forward portion 6, said recess opening forwardly to receive therein a portion of the tread member 7, as later described. The flange 13 preferably inclines downwardly and forwardly whereby the entrance to thee recess 14 is of reduced height. An upper surface 15 of the base member 5 is inclined upwardly from a forward edge 16 thereof toward the leg but at a lesser slope than the flange 13.

The rear portion 10 of the base member 5 has a longitudinally extending depending portion 17 provided with an upwardly opening channel 18 with a wider portion 19 forming an upwardly facing shoulder 20 on the forward side and adjacent but below an upper surface 21 of said rear portion 10 of the base member 5. The base member 5 has an upstanding wall 22 spaced to the rear of the channel 18, said wall forms the rear face of the base and has an upper edge 23 adapted to be flush or in registry with the tread surface 3. The rear wall 22 has a forwardly extending rib or portion 24 spaced between the upper edge 23 thereof and the surface 21 of the portion 10 of the base member.

The base member 5 is secured to the stair step 2 in any suitable manner, such as by an anchor portion extending into the stair step 2. In the illustrated structure, the base member 5 has spaced depending portions 25 and 26 defining a longitudinally extending channel or guideway 27 in a lower face thereof. The members 25 and 26 have facing flanges at lower edges to form a reduced opening and shoulders to provide support for a plurality of longitudinally spaced anchor members 29, such as metal straps, anchor bolts, or the like, extending into a form for constructing the stair step 2.

The tread member 7 is an elongated member particularly adapted to be made in long lengths and then cut to a suitable length corresponding to the length of the nose of the step, such length also corresponding to the length of the base member 5 on which the tread member 7 is mounted. The base member 5 also is of uniform cross-section for the length thereof whereby it can be extruded in long lengths and then cut to the desired length for the particular step.

The tread member may be formed of a single material, such as aluminum or the like, but it is preferred that the tread member be of different materials as for example a plate member 30 of extruded material and a surface portion 31 applied and secured, as by bonding, to the plate member to form the upper tread surface 32. The tread plate member 30 includes a flat portion 33 having an under surface 34 adapted to rest on the upper surface 21 of the rear portion 10 of the base member 5. The flat portion 33 has an upstanding wall 35 and an aligned depending rib 36 which rib extends into the widened portion of the channel 18 above the shoulder 20. The upstanding wall 35 terminates in a rearwardly extending flange 36 having a bottom surface 38 adapted to engage the rib 24 of the rear wall 22 of the base member, said flange 37 having an upper surface 39 which is flat and flush with the surface 32 of the surface portion or tread material 31 and the upper edge 23 of the base rear wall 22. It is preferred that the upper portion of the forward face of the wall 35 be inclined forwardly as at 40 to aid in retaining the tread material.

The flat portion 33 of the plate member 30 extends forwardly over the offset forward portion 6 and has a depending rib 41 adapted to engage the upper surface 21 of the base member 5 to provide support for the tread member 27. The flat portion 33 extends forwardly of the L-shaped member and flange 13 thereof and is turned downwardly, as at 42, terminating in a foot portion 43 which has flanges 44 and 45 extending forwardly and rearwardly thereof providing a generally T-shaped structure. The foot member 43 has a bottom surface 46 with an incline corresponding to the incline of the upper surface 15 of the base member 5 adjacent the forward edge 16 of said base member. The foot member or portion 43 preferably has a width corresponding to the space between the base forward edge 16 and a flat face of the upstanding leg 12 whereby a rear edge 47 of the flange 45 engages the upstanding leg 12 when a forward edge 48 of the foot member is flush or in registry with the forward edge 16 of the base member. An upper surface 49 of the flange 45 is inclined upwardly and outwardly from the edge 47 to provide a thickness greater than the entrance opening to the recess 14 and the flange 13 of the base member is thin enough to have limited resiliency to permit the flange 45 to enter the recess 14 to complete the assembly as later described. In the structure illustrated, the flange 44 has the upper surface inclined downwardly and outwardly to the edge 48 whereby the exposed edges 48 and 16 of the metal members is at a minimum.

The tread material 31 is applied to the plate member 30 to cover same from the wall 35 to the flange 44 presenting a rounded nose, as at 50, and a forward or front face 51 that is in registry or flush with the edge 48. While any suitable tread material may be applied and mounted to the plate member 30 it is preferred that the material be a long wearing material such as an epoxy resin with an abrasive 52 distributed therethrough with some exposed at the surface 32 to form a non-skid surface. To aid in holding the material in place, the plate member has a plurality of longitudinally extending upwardly inclined ribs 53 which extend into the tread material 31 and due to the incline cooperate with the inclined portion or surface 40 the rear wall 35 to aid in holding the tread material on the plate member 30.

When the tread member 7 is applied to the base member 5, the rear portion is secured in place by a suitable anchor, as for example a screw 54 adjacent each end of the tread member, said screw having a flat head 55 adapted to be positioned in a countersunk recess 56 with a threaded shank 57 of the screw 54 extending into the channel 18. The channel 18 is of less width than the diameter of the screw whereby the threads of the screw penetrate into the opposed surfaces of the channel to secure the screw in place.

A stair nosing structure such as described is prepared by extruding the base member 5 in a long length. The plate member of the tread member 7 is also extruded in long lengths and the epoxy or tread surface material 31 is applied thereto. To apply the nose structure to a stair step both the base 5 and the tread member 7 are cut to the specified lengths and the countersunk portions 56 are formed adjacent the end of the tread member 7 whereby a hole for the screw 54 is provided in the flange 37, then the base member 5 is positioned in a form (not shown) for constructing the stair step 2 and suitable anchors 29 are spaced longitudinally thereof and extend into the form. A suitable protective member (not shown) is mounted on the base member 5 to fill the space normally occupied by the tread member 7 during construction of the stair step 2. When construction is finished and it is desired to install the tread member 7, the protective member is removed and the tread member 7 positioned in over-lying relation to the base member with the rib 36 engaging the upper surface 21 of the rear portion 10 of the base member 5 and the surface 46 engaging the upper surface 15 of the forward portion 10 of the base member 5 adjacent the forward edge 16. The tread member 7 is then moved rearwardly causing the flange 45 to enter the recess 14 and the forward end of the flange 13 to engage the surface 49 prior to the tread member being in place. Further rearward movement of the tread member causes the wedging action forcing the surface 46 into tight engagement with the upper surface 15 of the base member. However, the tread member 7 is forced rearwardly until the edge 47 engages the upstanding leg 12 at which time the rib 36 has entered the wide portion 19 of the channel 18, the under surface 34 of the plate member 30 engaging the surface 21 of the base member, the flange 37 engages the rib 24 on the rear wall 35 of the base member 5 and the forward edge 48 registers with the forward edge 16 of the base member and the surface 51 of the tread material is flush with the edges 48 and 16 of the plate member and base member respectively and the surface 32 of the tread material is level or flush with the upper surface 3 of the step. The screws 54 are then inserted through the countersinks 56 and threaded into the channel 18 to secure the tread member to the base member. This not only holds the rear portion of the tread member against upward movement but also prevents lateral movement so that the wedging action of the flanges 13 and 45 and limited resiliency of the flange 13 provide a positive very strong connection holding the forward or front of the tread member in position, assuring a finished, neat appearing structure with long life.

In the form of the invention illustrated in FIG. 5, a base member 60 differs from that shown in FIGS. 1 to 4 inclusive in that the wider portion 19 of the channel 18 is omitted and a rear wall 61 extends upwardly from adjacent the rear of the channel 18 on a level with an upper face 62 of a plate portion 63 of the base member 60. The rear wall 61 is inclined rearwardly and upwardly and terminates in an upright portion 64 having an upper edge 23 adapted to be flush with the upper surface 3 of the stair step 2. The base member 60 also has omitted the offset of the base member 5 shown in FIGS. 1 to 4 inclusive whereby the plate portion 63 extends as a planar member to a forward edge 65 of the base member. The interlock recess is reversed from that shown in FIGS. 1 to 4 inclusive and in the structure illustrated in FIG. 5, the base member has an upstanding wall 66 as said forward edge and terminating in a rearwardly and downwardly inclined flange 67 spaced from the plate portion 63 to form a recess 68 having a reduced opening 69 at the rear. The flange 67 is of a thickness whereby it will have resiliency in the same manner as the flange 13.

A tread member 70 includes an extruded plate member 71 that has the upstanding rear wall 35. However, the rearwardly extending flange 72 has a rear surface 73 shaped to conform to corresponding forward surfaces of the rear wall 61 on the base member, said flange 72 having the countersink and hole 56 to receive the screw 54 and head 55 thereof. A forward portion of the plate member 71 has a flange 74 extending forwardly from an upstanding wall 75. The wall 75 terminates in a forwardly extending flange 76 having a front edge 77 adapted to register with the flat or forward edge 65 of the base member 60. The lower surface of the flange 76 preferably substantially engaging the top of the upstanding wall portion 66 when in assembled relation. The upstanding wall 75 on the plate member 71 has a greater spacing from the edge 77 than the distance from the end of the flange 67 to the edge 65 of the base member 60 to provide suitable spacing or clearance therebetween. The flange 74 is of such length that the forward or front edge 78 thereof engages a rear face of the wall 66 on the base member 60 when the edge 77 is registering with the edge 65. The plate member 71 has a plurality of upstanding portions 79 with inclined sides 80 providing a dovetail arrangement to aid in holding a tread material 81 to the plate member. The tread material 81 being of a suitable material and preferably being of a long-wearing, non-skid material, such as epoxy with an upper non-skid surface 82 provided by suitable abrasive or the like.

In using the nosing member shown in FIG. 5, the metal portions are prepared in a manner substantially corresponding to the same as that described relative to the structure shown in FIGS. 1 to 4. Also the base member is applied to the step in the same manner. When it is time to apply the tread member, it is moved over the base member and the flange 74 inserted into the recess 68 and as the tread member is moved forwardly the rear portion is swung downwardly whereby the flange 72 is forward of and in contact with the rear wall 61. As this movement progresses the inclined surface of the flange 74 wedging under the flange 67 forces the forward portion of the plate 71 tight against the upper surface 62 of the plate portion 63 of the base member 60. This is continued until the forward edge 78 of the flange 74 engages the wall 66 at which point the edge 77 is aligned with the edge 65 and the rear portion of the tread member is down engaging the surface 62 of the plate portion 63. The screws 54 are then inserted into the holes and threaded into the channel opposed surface portions defining the channel 18 to secure the rear portion of the tread member to the base member.

In the form of the invention illustrated in FIG. 6, the forward portions of a base member 85 and a tread member 86 are the same as shown and described relative to the structure shown in FIG. 5 and function the same as described relative thereto. The rear portions differ whereby the structure provides a drive fit to secure the rear portion of the tread member 86 to the base member 85.

The channel 18 is defined by laterally spaced wall members 87 and 88 depending from the base member 85 and having a plurality of spaced longitudinally extending ridges 89 and 90 respectively thereon. A rear wall 91 extends upwardly from adjacent the rear of the channel 18 on a level with an upper face 92 of a plate portion 93 of the base member 85. The rear wall 91 is inclined rearwardly and upwardly and terminates in an upper edge 23 adapted to be flush or coplanar with the upper surface 3 of the stair step 2.

The tread member 86 includes an extruded metal portion which has a rear wall 94 adjacent the rear of the tread member 86 and having a depending portion 95 and an upstanding portion 96. The depending portion 95 of the rear wall 94 has a plurality of spaced longitudinally extending ridges 97 and 98 on opposite sides thereof. The ridges 97 and 98 on the depending portion 95 are shaped and positioned to inter-engage with the ridges 89 and 90 on the wall members 87 and 88 when the tread member 86 is forced downwardly onto the base member 85 to secure the tread member 86 to the base member 85.

The upstanding portion 96 of the rear wall 94 is inclined rearwardly and upwardly and has an upper edge 99 adapted to be flush with the upper edge 23 of the rear wall 91 of the base member 85 and with the upper surface 3 of the stair step 2. The upstanding portion 96 of the rear wall 94 has a rear surface inclined to conform to and engage the corresponding facing surface of the rear wall 91 on the base member 85 and the upstanding portion 96 of the rear wall 94 has a forward surface 100 which is inclined forwardly and upwardly to aid in holding a tread material 101 to the tread member 86.

In using the stair nosing structure illustrated in FIG. 6, the metal portions are prepared in a manner substantially corresponding to the manner described relative to the structure illustrated in FIGS. 1 to 4 and FIG. 5 and the base member 85 is secured to the step in the same manner. When it is time to apply the tread member 86, the tread member is moved over the base member 85 and the forward portions thereon are engaged in a manner similar to the manner of engagement of the forward portions of the base member and tread member illustrated in FIG. 5 and as the tread member 86 is moved forwardly the rear portion thereof is swung downwardly and then driven downwardly until the upper edge 99 of the rear wall 94 is flush or in registry with the upper face 92 of the rear wall 91 whereby engagement of the facing surfaces of the rear wall 91 and the upstanding portion 96 of the rear wall 94 and driving of the depending portion 95 into the recess 18 effects a tightening action between the base member 85 and the tread member 86 and the respective portions of the forward portions thereof until said respective portions thereof are in engagement in a manner similar to that previously described for the stair nosing structure illustrated in FIG. 5.

In the form of the invention illustrated in FIG. 7, the forward portions of a base member 106 and a tread member 107 are the same as shown and described relative to the structure shown in FIGS. 5 and 6 and function the same as described relative thereto. The rear portions differ whereby the structure provides a snap-on or drive fit to secure the rear portion of the tread member 107 to the base member 106.

The channel 18 is omitted froom the base member 106 and a rear wall 108 extends upwardly from adjacent the rear of the base member 106 and has an upper edge 109 adapted to be flush or coplanar with the upper surface 3 of the stair step 2. The base member 106 has an upstanding leg 110 positioned adjacent and forward of the rear wall 108. The upstanding leg 110 has a plurality of spaced longitudinally extending ridges 111 on a forward face thereof. The upstanding leg 110 has an upper edge 112 positioned below the upper edge 109 of the rear wall 108, for a purpose to be described.

The tread member 107 includes an extruded plate member portion having an upstanding rear wall 113 with a rearwardly extending flange 114 having an upper face or surface 115 adapted to be flush or coplanar with the upper edge 109 of the rear wall 108 and with the upper surface 3 of the stair step 2. The upstanding rear wall 113 of the tread member 107 has a plurality of spaced longitudinally extending ridges 116 on a rearwardly facing surface thereof. The ridges 116 are formed to be interengageable with the ridges 111 to secure the tread member 107 to the base member 106.

It is desirable to provide means between and engaging the base member 106 and the tread member 107 to cushion any relative movement therebetween after the tread member 107 is mounted on the base member 106. Therefore, a lower surface of the extruded plate member portion of the tread member 107 has a longitudinally extending recess 117 therein to receive an elastic or seal member 118 therein which is engageable with an upper surface of the base member 106 thereby substantially reducing or eliminating noise in the event of relative movement between the base member 106 and the tread member 107.

In using a stair nosing structure as shown in FIG. 7, the forward portions of the base member 106 and the tread member 107 are engaged as previously described for the structures illustrated in FIGS. 5 and 6. The tread member 107 is moved forwardly and the rear portion thereof is swung downwardly whereby the rearwardly facing surface of the upstanding rear wall 113 of the tread member 107 engaged the forwardly facing surface of the upstanding leg 110 on the base member 106 and the ridges 111 and 116 inter-engage as the tread member 107 is driven downwardly until the upper face or surface 115 of the rearwardly extending flange 114 is flush or coplanar with the upper edge 109 of the rear wall 108 of the base member 106 thereby effecting engagement of facing surfaces of the base member 106 and the tread member 107 and a tight fit between the forward portions thereof. A lower surface of the rearwardly extending flange 113 is positioned above the upper edge 112 of the upstanding leg 110 to provide clearance therebetween when the tread member 107 is secured to the base member 106.

In the form of the invention illustrated in FIG. 8, the step is shown as a pan type it has a radius on the forward edge as at 119. The forward portions of a base member 120 and a tread member 121 are the same as shown and described relative to the structures illustrated in FIGS. 5, 6 and 7 and function the same as described relative thereto except the lower forward surface 120 of the base member substantially conforms in shape to the radius on the step pan 119'. It is to be understood that with all of the forms shown the base member would have a forward lower surface to substantially eliminate any gap between it and the step or pan. The rear portions differ whereby the structure has a wedge member 122 adapted to be driven between rear flange members of the base member 120 and the tread member 121 to effect inter-engagement of spaced ridges on facing surfaces of the wedge member and the rear flange members, as later described.

As in the structure illustrated in FIG. 7, the channel 18 is omitted from the base member 120 and a rear wall 123 extends upwardly from adjacent the rear of the base member 120, however, the rear wall 123 is inclined rearwardly and upwardly and terminates in an upper edge 124 adapted to be flush or coplanar with the upper surface 3 of the stair step 2. The rear wall 123 has a plurality of spaced longitudinally extending ridges 125 on a forwardly facing surface thereof.

The tread member 121 includes an extruded metal portion which has a rear wall 126 adjacent the rear of the tread member 121 and inclined forwardly and upwardly and terminates in an upper edge 127 adapted to be flush or coplanar with the upper surface 3 of the stair step 2. The rear wall 126 has a plurality of spaced longitudinally extending ridges 128 on a rearwardly facing surface thereof.

The wedge member 122 has an upper edge 129 adapted to be flush or coplanar with the upper edge 124 of the rear wall 123 and with the upper edge 127 of the rear wall 126 when in an installed position between the rear walls 123 and 126. The wedge member 122 has downwardly and inwardly inclined opposite faces and a plurality of spaced longitudinally extending ridges 130 and 131 on said opposite faces respectively to inter-engage with the ridges 125 and 128 respectively.

The rear wall 123 and the rear wall 126 are positioned to receive the wedge member 122 therebetween and the ridges on the rear walls 123 and 126 are shaped and positioned to inter-engage with the ridges on respective opposite faces of the wedge member 122 to secure the tread member 121 to the base member 120.

In using a stair nosing structure constructed as described and shown in FIG. 8, the forward portions of the base member 120 and the tread member 121 are engaged as previously described for the structure illustrated in FIGS. 5, 6 and 7. The tread member 121 is placed in engagement with the base member 120 and is moved forwardly thereover. The wedge member 122 is positioned in the space between the rear wall 123 and 126 and driven downwardly until the upper edge 129 thereof is flush or coplanar with the upper edges 124 and 127 and with the tread surface 3 of the stair step 2 thereby effecting engagement of facing surfaces of the base member 120 and the tread member 121 and a tight fit between the forward portions thereof.

It is to be understood that while we have illustrated and described certain forms of our invention, it is not to be limited to these specific forms or arrangement of parts herein described and shown.

What We claim and desire to secure by Letters Patent is:

1. A stair nosing structure for a stair step having a tread surface and a forwardly facing riser surface, said stair nosing structure comprising:
   a. an elongated relatively rigid base member adapted to be mounted on a stair step adjacent a forward facing riser surface thereof, said base member having forward and rear edges and an upper face and a lower face, said forward edge being positioned flush with said riser surface, said base member having an anchor portion adapted to be secured to the stair step;
   b. an elongated tread member having forward and rear edges and overlying said base member and engaging the upper face thereof;
   c. interengaging means on the base member and tread member adjacent one of the forward and rearward edges operative to clamp said tread member to the base member adjacent said edges, said interengaging means including:
      1. engageable longitudinally extending portions on said base member and said tread member adjacent respective forward edges thereof;
      2. an inclined surface on one of said longitudinally extending portions and positioned relative to the other longitudinally extending portion;
      3. a flange member on the other of said longitudinally extending portions, said flange member extending outwardly from one of said base member and said tread member and having a portion engageable by said inclined surface in response to relative lateral movement of said tread member and said base member providing a wedging action forcing said tread member into tight engagement with said base member, said flange member being sufficiently resilient to permit further relative lateral movement to a selected location to position the forward edge of said tread member flush with the forward edge of said base member;
   d. means adjacent the other of said forward and rearward edges fastening the tread member to the base member.

2. A stair nosing structure as set forth in claim 1 and including:
   a. stop means on said base member and on said tread member limiting lateral movement of said tread member relative to said base member in effecting said wedging action to stop same when the forward edges of said base member and said tread member are in registry.

3. A stair nosing structure as set forth in claim 1 wherein:
   a. said base member and said tread member each have a longitudinally extending rear flange member adjacent respective rear edges thereof;
   b. one of said base member and said tread member has an inclined surface adjacent the rear edge thereof and engageable with and positioned relative to a portion of the other of said base member and said tread member whereby the rear flange members of said base member and said tread member are moved into engagement when the tread member is moved laterally of said base member to register the forward edges thereof.

4. A stair nosing structure as set forth in claim 1 wherein:
   a. said base member has a longitudinally extending upstanding wall member adjacent the rear edge thereof and having an upper edge and a forwardly and downwardly inclined surface extending below the upper edge of said upstanding wall member;
   b. said tread member has a longitudinally extending upstanding wall member adjacent the rear edge thereof and having a rearwardly extending portion positioned to engage and be supported on said forwardly and downwardly inclined surface of said upstanding wall member of said base member;
   c. the rearwardly extending portion of said upstanding wall member of said tread member and the forwardly and downwardly inclined surface of said upstanding wall member of said base member are moved into engagement when the tread member is moved laterally of said base member to register the forward edges thereof; and
   d. said means securing said tread member to said base member includes a longitudinally extending recess in said base member adjacent the rear edge thereof and a fastening member on said rearwardly extending portion of said upstanding wall member of said tread member and extending into said longitudinally extending recess in said base member.

5. A stair nosing structure for a stair step having a tread surface and a forwardly facing surface, said stair nosing structure comprising:
   a. an elongated relatively rigid base member adapted to be mounted on a stair step adjacent a forward facing surface thereof, said base member having forward and rear edges and an upper face and a lower face, said base member having an anchor portion adapted to be secured to the stair step;
   b. an elongated tread member having forward and rear edges and overlying said base member and engaging the upper face thereof;

c. interengaging means on the base member and tread member adjacent one of the forward and rearward edges operative to clamp said tread member to the base member adjacent said edges, said interengaging means including:
1. an upstanding and longitudinally extending leg on said base member and spaced rearwardly of the forward edge of said base member, said upstanding leg having a forwardly extending flange thereon;
2. a longitudinally extending downwardly turned portion on said tread member and having a foot portion thereon, said foot portion having an inclined bottom surface and laterally extending opposed flanges, one of said flanges having a forward edge alignable with the forward edge of said base member and the other flange being engageable with the upstanding leg and forwardly extending flange of said base member;
3. an inclined upper surface on said base member between the forward edge thereof and the upstanding leg thereon and engageable by the inclined bottom surface of said foot portion of said tread member whereby said tread member is forced into engagement withh the upper face of said base member when the tread member is moved laterally of said base member to move said tread member to a selected location;
d. means adjacent the other of said forward and rearward edges fastening the tread member to the base member.

6. A stair nosing structure as set forth in claim 5 wherein:
a. said tread member has a metal plate member portion and a long wearing tread material thereon, said tread material having a non-skid surface;
b. said metal plate member portion of said tread member and said base member have engageable longitudinally extending portions;
c. said forward edge of said one flange on the foot portion being thin;
d. said tread material having an upper surface rounded downwardly in a convex curve to said thin forward edge to present a narror metal portion in view below the tread material.

7. A stair nosing structure for a stair step having a tread surface and a forwardly facing surface, said stair nosing structure comprising:
a. an elongated relatively rigid base member adapted to be mounted on a stair step adjacent a forward facing surface thereof, said base member having forward and rear edges and an upper face and a lower face, said base member having an anchor portion adapted to be secured to the stair step;
b. an elongated tread member having forward and rear edges and overlying said base member and engaging the upper face thereof;
c. interengaging means on the base member and tread member adjacent one of the forward and rearward edges operative to clamp said tread member to the base member adjacent said edges, said interengaging means including:
1. a generally planar forward portion on said base member and having an upstanding and longitudinally extending leg thereon, said leg being spaced rearwardly of the forward edge of said base member and having a forwardly extending flange thereon;
2. a longitudinally extending downwardly turned portion on said tread member and having a foot portion thereon, said foot portion having an inclined bottom surface and laterally extending opposed flanges, one of said flanges having a forward edge alignable with a forward edge of said forward portion of said base member and the other flange being engageable with the upstanding leg and forwardly extending flange of said base member;
3. an inclined upper surface on said forward portion of base member between the forward edge thereof and the upstanding leg thereon and engageable by the inclined bottom surface of said foot portion of said tread member whereby said tread member is forced into engagement with the upper face of said base member when the tread member is moved laterally of said base member to move respective forward edges of said base member and said tread member into registry one with the other;
d. means adjacent the other of said forward and rearward edges fastening the tread member to the base member.

8. A stair nosing structure for a stair step having a tread surface and a forwardly facing riser surface, said stair nosing structure comprising:
a. an elongated relatively rigid base member having forward and rear edges and an upper face and a lower face, said base member being adapted to be mounted on a stair step adjacent a forward facing riser surface thereof with said forward edge flush with said riser surface;
b. an anchor portion on said base member adapted to be secured to the stair step retaining said forward edge flush with said riser surface;
c. an elongated tread member having forward and rear edges and overlying said base member and engaging the upper face thereof;
d. said base member has portions defining a recess adjacent the forward edge thereof;
e. said tread member has a portion adjacent the forward edge thereof and positioned to be received in the recess in said basemember;
f. said recess defining portions of said base member and said tread member portion are sized and shaped with one of said recess defining portions and said tread member portions having an inclined surface engaging the other said portion to effect a wedging action therebetween and tight engagement of said tread member with said base member when said tread member is moved laterally of said base member to register respective forward edges thereof;
g. stop means on said base member and on said tread member for limiting relative lateral movement of the tread member on the base member and positioning the forward edge of the tread member flush with the forward edge of the base member;
h. means securing said tread member to said base member to hold same thereon and the forward edges flush.

9. A stair nosing structure as set forth in claim 8 wherein:

a. said base member has a portion adjacent the rear edge thereof and having a plurality of spaced longitudinally extending ridges thereon;
b. said tread member has a portion adjacent the rear edge thereof and having a plurality of spaced longitudinally extending ridges thereon; and
c. the ridges on said tread member portion are shaped and positioned to inter-engage with the ridges on said base member portion when the tread member is forced downwardly onto the base member to secure said tread member to said base member.

10. A stair nosing structure as set forth in claim 8 wherein;
a. said base member has a downwardly extending recess therein and positioned adjacent the rear edge thereof and defined by longitudinally extending and laterally spaced opposed surfaces;
b. the opposed surfaces defining said recess each have a plurality of spaced longitudinally extending ridges thereon;
c. said tread member has a longitudinally extending depending portion and positioned adjacent the rear edge thereof and having a plurality of spaced longitudinally extending ridges thereon; and
d. the ridges on the opposed surfaces defining said downwardly extending recess in said base member are shaped and positioned to inter-engage with the ridges on the depending portion of said tread member when the tread member is forced downwardly onto the base member to secure said tread member to said base member.

11. A stair nosing structure as set forth in claim 8 wherein:
a. said recess adjacent the forward edge of said base member extends longitudinally of said base member and opens rearwardly thereof;
b. said tread member has portions adjacent the forward edge thereof and positioned to overly the recess defining portions of said base member; and
c. the portions of said tread member overlying the recess defining portions of said base member are positioned to define a recess adapted to receive the recess defining portions of said base member therein.

12. A stair nosing structure for a stair step having a tread surface and a forwardly facing surface, said stair nosing structure comprising:

a. an elongated relatively rigid base member adapted to be mounted on a stair step adjacent a forward facing surface thereof, said base member having forward and rear edges and an upper face and a lower face;
b. an anchor portion on said base member adapted to be secured to the stair step;
c. an elongated tread member having forward and rear edges and overlying said base member and engaging the upper face thereof;
d. means securing said tread member to said base member;
e. stop means on said base member and on said tread member for positioning respective forward edges thereof in registry one with the other;
f. said base member has portions defining a recess adjacent the forward edge thereof;
g. said tread member has a portion adjacent the forward edge thereof and positioned to be received in the recess in said base member; and
h. said recess defining portions of said base member and said tread member portion are sized and shaped with one of said recess defining portions and said tread member portions having an inclined surface engaging the other said portion to effect a wedging action therebetween and tight engagement of said tread member with said base member when said tread member is moved laterally of said base member to register respective forward edges thereof,
i. said base member having a portion adjacent the rear edge thereof and having a plurality of spaced longitudinally extending ridges thereon;
j. said tread member having a portion adjacent the rear edge thereof and having a plurality of spaced longitudinally extending ridges thereon;
k. a wedge member having a plurality of spaced longitudinally extending ridges on opposite faces thereof; and
l. said tread member portion and said base member portion being positioned to receive said wedge member therebetween and the ridges on said base member portion and said tread member portion being shaped and positioned to interengage with the ridges on respective opposite faces of said wedge member to secure said tread member to said base member.

* * * * *